Figure 3:
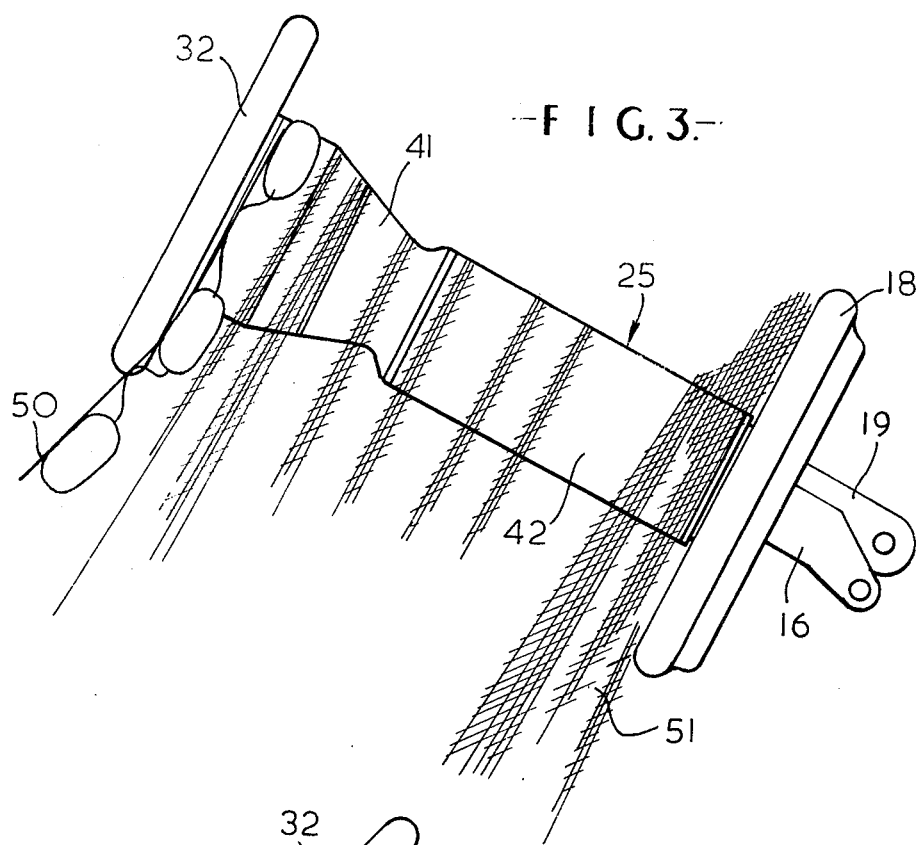

United States Patent

Bjørshol

[11] 4,032,113
[45] June 28, 1977

[54] WINCHES FOR HAULING ON BOARD PURSE NETS OR SIMILAR FISHING DEVICES

[76] Inventor: Kolbjørn Bjørshol, 6560 Langoyneset, Norway

[22] Filed: Apr. 17, 1975

[21] Appl. No.: 569,012

[30] Foreign Application Priority Data

Apr. 26, 1974 Norway ............................ 741513

[52] U.S. Cl. .................................... 254/138; 43/8; 74/230.24
[51] Int. Cl.² ........................................ A01K 73/06
[58] Field of Search ............... 254/138; 74/230.24, 74/230.01; 43/8

[56] References Cited

UNITED STATES PATENTS

| | | | |
|---|---|---|---|
| 3,305,218 | 2/1967 | Bjorshol | 254/137 |
| 3,497,182 | 2/1970 | Puretic | 43/8 |
| 3,643,921 | 2/1972 | Puretic | 43/8 |

*Primary Examiner*—Robert J. Spar
*Assistant Examiner*—Donald W. Underwood

*Attorney, Agent, or Firm*—Weingarten, Maxham & Schurgin

[57] ABSTRACT

Winches for hauling on board fishing vessels purse nets or similar fishing devices. The nets are pulled by frictional engagement with at least two rollers rotatable in mutually opposite directions and arranged in spaced apart relationship to project freely outwards from a common pivotable end member for adjusting the rollers in various oblique positions relative to a vertical plane. The rollers each have inner and outer rest portions with friction-promoting means, such as rubber coating, the inner rest portion having a smaller diameter than the outer rest portion thereby enabling a float-supporting side of the net to bear against the roller between the inner and outer rest portions in a manner regulated by the oblique positioning of the rollers. Furthermore, each roller has an annular portion formed without friction-promoting means to constitute a net-slide portion. By arranging the net-slide portion between the two rest portions, the float-supporting side of the net can be readily controlled by relatively slow pivoting of the rollers in the one or the other direction from the outer rest portion to the slide portion and from the inner rest portion to the slide portion.

9 Claims, 4 Drawing Figures

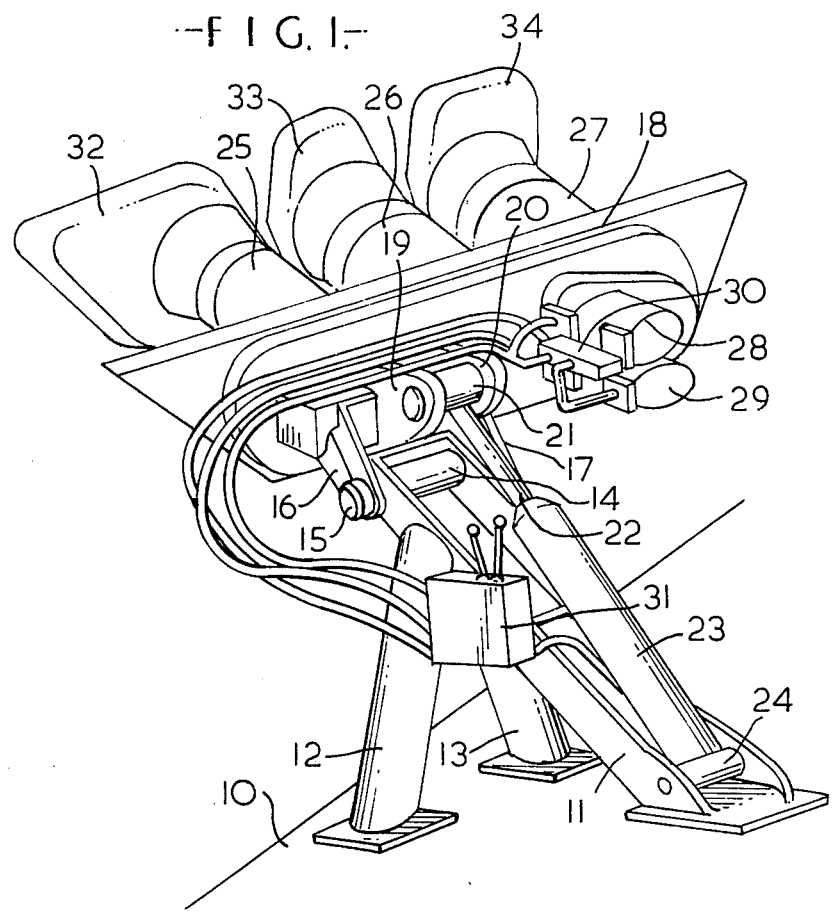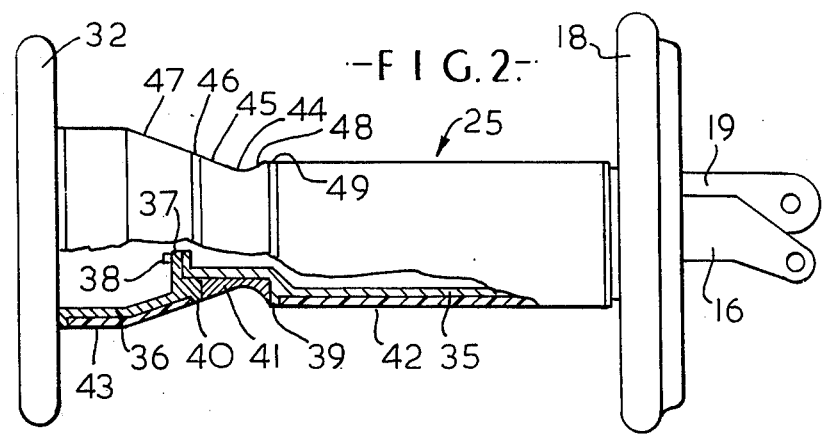

WINCHES FOR HAULING ON BOARD PURSE NETS OR SIMILAR FISHING DEVICES

This invention relates to winches for hauling on board purse nets or similar fishing devices.

The winch according to the invention can, as regards its basic features, be constructed as shown in Norwegian Patent Specification No. 111,053.

In practice, there have been utilised, according to a first construction, roller surfaces of different diameters on an outer and an inner annular rest portion so that one has been able to achieve a certain regulation of the drawing-in of the float-supporting side of the net relative to the remaining part of the net in order to be able, thereby, to purse the net together in an intended manner for sewing up the catch in the net, by obliquely positioning the rollers correspondingly relative to a vertical plane. The mentioned construction has, however, not been completely satisfactory in practice since there has only been the possibility of achieving the increase of the drawing-in speed by transferring the float-supporting side of the net from the inner lying rest portion to the outer rest portion while, on the other hand, there has not been the possibility of achieving the reduced drawing-in speed on the float-supporting side of the net when the latter is present on the inner rest portion. In order to solve this problem there has been marketed another construction having rollers where the outer rest portion can be driven independently of the inner rest portion. A winch construction based on such a solution has, however, proved to be complicated to erect and is relatively awkward to operate.

With the present invention, the aim is to be able to solve the afore-mentioned problem of the first construction without being dependent on a complicated winch construction, as well as to achieve an equally easy operation as in the first construction.

According to the present invention a winch for hauling a purse net on board a fishing vessel comprises at least two rollers rotatable in mutually opposite directions for pulling said net by frictional engagement therewith and arranged in spaced apart relationship to project freely outwards from a common pivotable end member for adjusting said rollers in various oblique positions relative to a vertical plane, said rollers each having inner and outer rest portions with friction-promoting means, the inner rest portion having a smaller diameter than the outer rest portion enabling a float-supporting side of the net to bear against the roller between the inner and outer rest portions in a manner regulated by the oblique positioning of the rollers, and each roller having an annular portion formed without friction-promoting means to constitute a net-slide portion.

By arranging such a net-slide portion between the two rest portions, one can readily control, by relatively slow pivoting of the rollers in the one or other direction, the float-supporting side of the net from the outer rest portion to the slide portion and from the inner rest portion to the slide portion in order to obtain the desired slide effect on the float-supporting side of the net. By correspondingly quicker or abrupter pivoting of the rollers in the one or other direction, there can be correspondingly ensured a rapid transfer from the outer rest portion to the inner rest portion, and vice versa, without acting on the net-slide portion.

It is preferred that the net-slide portion is provided with an essentially smaller diameter than the inner rest portion and preferably is provided with a marked stop-forming depression. By this it can be guaranteed that immediately the float-supporting side of the net is led into position in the net-slide portion, it is ensured a place in the latter. By designing the net-slide portion with an essentially smaller diameter than the inner rest portion, there can be obtained a marked gradation of the speed of drawing in of the float-supporting side of the net immediately the latter is received in the net-slide portion.

In order to ensure a rapid and unimpeded transfer from the net-slide portion to each of the adjacent rest portions, where this is desirable, the net-slide portions extends obliquely over towards the two adjacent rest portions which have greater diameters, the rest portion with the greatest diameter preferably extending down into a conical surface known per se flush with parts of the net-slide portion.

Figure 4:
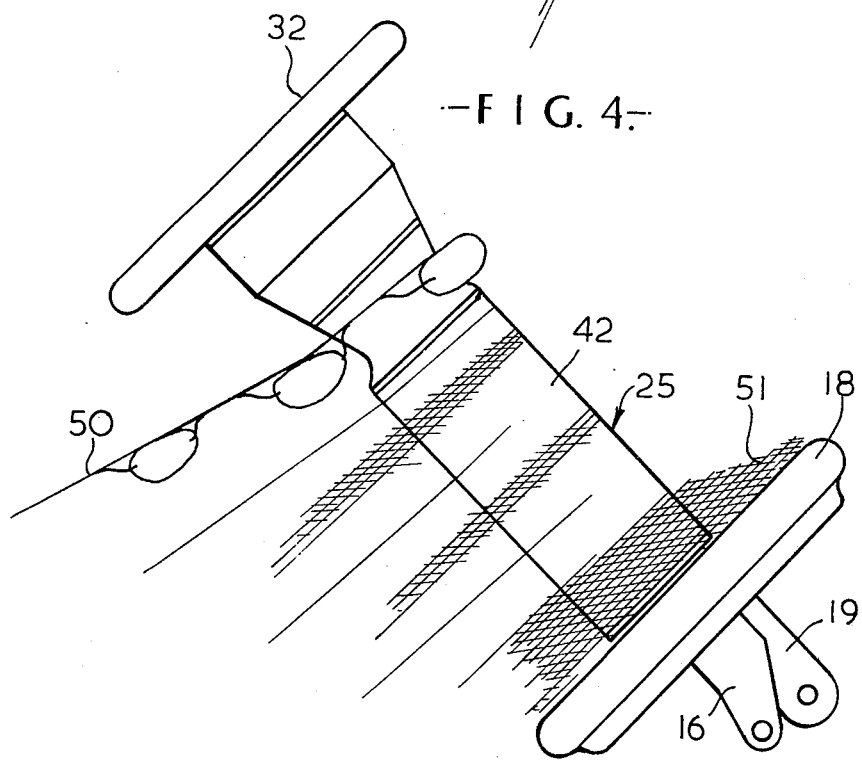

In order that the invention can be more clearly understood, a preferred embodiment thereof will now be described, by way of example, with reference to the accompanying drawings in which:

FIG. 1 is a perspective view of a winch illustrated in two different working positions, shown respectively in full and dotted lines, FIG. 2 is a side view, partly in section, of one of the winch rollers, FIG. 3 is a side view of a winch roller in a first working position; and FIG. 4 is a side view of the winch roller of FIG. 3 in a second working position.

To a ship's deck 10 there is secured a winch base consisting of three support legs 11, 12, 13 which extend obliquely together towards the top where there is formed a rotary bearing 14 for a shaft pin 15 which via two short support arms 16, 17 supports pivotably mounted an end member 18. The end member 18 is further hinged at 21 via two other short support arms 19, 20 to the outer end of a piston rod 22 of a hydraulic pressure medium cylinder 23 which is hinged at 24 to the lower end of the one support leg 11, for pivoting of the end member 18 about the shaft pin 15 in arbitrary positions of which two actual working positions are shown in FIGS. 3 and 4.

On the end member 18 there are rotatably mounted three rollers 25, 26, 27 which are driven by a gearing received internally in the end member, by means of a pair of hydraulically driven motors 28, 29. By means of a valve 30 the motors can be coupled together in a desired manner for operation of the rollers with different power transmission and/or with the speed of rotation adapted mutually as required. By means of a hand valve 31 the operation of the motors 28, 29 together with the operation of the cylinder 23 can be further regulated.

The end member 18 projects laterally outside the rollers 25-27 for support of the net, while this passes respectively over and under the rollers in an S-shaped path. At the end of each roller there are arranged end shields 32, 33, 34 which guarantee that the net is in position on the respective rollers. The end shields are fixed in a nonrotatable manner to the end member 18 by way of support shafts (not shown) located internally in the rollers.

The end member 18 extends obliquely downwards and inwards towards the deck of the ship in view of the path of the line of the net outside the ship, and extends further to the storage location for the net on the ship.

Each roller is designed as a support cylinder 35 of aluminum. To the support cylinder 35 (see FIG. 2) there is secured at the end a skirt member 36 of aluminum via a fastening flange 37 by means of screw bolts 38. Between an annular projection 39 on the support cylinder 35 and end flange 40 on the skirt member 36 there is fixed a light, readily exchangeable ring member 41 of aluminum. On the main surface of the support cylinder 35, there is secured a friction-promoting rubber coating 42 from the one end of the roller over to the annular projection 39 to form an inner rest portion and correspondingly there is secured on the skirt member a friction-promoting rubber coating 43 from the other end of the roller over to the end flange 40 on the skirt member 36 to form an outer rest portion. The ring member 41 is not coated with a friction-promoting coating and is not provided either with other friction-promoting means, but is preferably shaped as smoothly as possible in order to form an effective net-slide portion.

Referring to FIG. 2, the annular member 41 is provided with a concave groove 44 which is uniformly chamfered or rounded off from the projection 39 and the end flange 40 respectively. One side surface 45 of the groove 44 and correspondingly peripheral surface 46 of the end flange 40 run flush with a conical transition portion 47 of the rubber coating 43, while its opposite side surface 48 extends convexly curved over into the peripheral surface 49 of the projection 39 on the support cylinder 35. It is possible to make several differing forms of the ring member and/or adjacent portions in order to achieve a desired guide effect or locking effect over the ring member. For example, the projection 39 on the support member 36 can project a distance radially outside the rubber coating 42, in order to form a marked termination on the inner portion of the roller (the main surface on the roller) so as to prevent accidental transfer of the net from the said inner portion to the net-slide portion.

It is possible by a quite simple pivoting of the roller from the position which is shown in FIG. 3 to the position which is shown in FIG. 4 to transfer the float-supporting side of the net 50 from the outer rest portion on the roller, that is to say the rubber coating 43 of the skirt portion 36, to the net-slide portion of the roller, that is to say to the groove 44 of the ring member 41. By further pivoting of the roller, the float-supporting side of the net can be permitted to wander further downwards along the roller to the inner lying portion, that is to say along the rubber-coated main portion 42 on the support cylinder 35. By designing the outer rest portion and the inner lying rest portion in a manner known per se with different diameters, there can be achieved a certain regulation of the speed of pull of the float-supporting side of the net relative to the rest of the net 51, by corresponding pivoting of the roller. By designing the intermediate portion 41 as a net-slide portion, there can be obtained a further possibility for regulating the speed of pull on the float-supporting side of the net. By effecting a rapid or relatively sudden pivoting of the roller, the float-supporting side of the net can be guided almost directly from the outer to the inner lying rest portion, and vice-versa without acting on, to a substantial degree, the intermediate net-slide portion.

Alternatively, the net-slide portion can be arranged between the end shield and the skirt portion 36 instead as shown between the skirt portion 36 and the support portion 35. In such an alternative embodiment, the skirt portion can extend continuously over into the support portion without a special boundary between these portions.

What I claim is:

1. In a winch for hauling a purse net on board a fishing vessel comprising at least two rollers rotatable in mutually opposite directions for pulling said net by frictional engagement therewith, a common pivotable end member from which the rollers project freely outwards in spaced apart relation and for adjusting said rollers in various oblique positions relative to a vertical plane, wherein each of said rollers comprises:
   an inner rest portion having friction-promoting means on its surface;
   an outer rest portion having friction-promoting means on its surface;
   said inner rest portion having a diameter smaller than said outer rest portion; and
   an annular portion arranged between said inner and outer rest portions thereby constituting a net-slide portion said net-slide portion being formed without friction-promoting means on its surface, the net, when being hauled by said winch, normally rides over said inner rest portion of said rollers, a float-portion of said net being made to selectively ride over said annular portion and said outer rest portion as regulated by the oblique positioning of said rollers, when riding over said outer rest portion said float-portion moves at increased speed with respect to that portion of the net riding over said inner rest portion, and when riding over said annular portion said float-portion moves at decreased speed with respect to that portion of the net riding over said inner rest portion.

2. The winch according to claim 1, wherein the net-slide portion has a substantially smaller diameter than the inner rest portion.

3. The winch according to claim 2 wherein said net-slide portion is concave, the surface of said net-slide portion sloping abruptly from the narrowest diameter of said concave surface to intersect the outer surface of said inner rest portion thereby providing a marked stop-forming depression.

4. The winch according to claim 1, wherein the net-slide portion extends obliquely over to the two adjacent rest portions of greater diameter.

5. The winch according to claim 4, wherein the outer rest portion of greatest diameter extends with a conical surface flush with the net-slide portion.

6. The winch according to claim 1, wherein the friction-promoting means of the inner and outer rest portions are rubber coatings.

7. In a winch for hauling a purse net on board a fishing vessel comprising at least two rollers rotatable in mutually opposite directions for pulling said net by frictional engagement therewith, a common pivotable end member from which the rollers project freely outwards in spaced apart relation and for adjusting said rollers in various oblique positions relative to a vertical plane, wherein each of said rollers comprises:
   an inner rest portion having friction-promoting means on its surface;
   an outer rest portion having friction-promoting means on its surface;

said inner rest portion having a diameter smaller than said outer rest portion thereby enabling a float-supporting side of the net to bear against said roller between said inner and outer rest portions in a manner regulated by the oblique positioning of said rollers;

an annular portion formed without friction-promoting means to constitute a net-slide portion;

each of said rollers further comprising:

- a support cylinder having a first fastening flange at one end;
- a skirt member having a second radial fastening flange, said support cylinder being secured to said skirt member by means of said fastening flanges;
- a radial annular projection formed on said support cylinder;
- a radial end flange on one end of said skirt member and spaced from said annular projection on said support cylinder;
- an exchangeable ring member mounted between said end flange of said skirt member and said annular projection of said support cylinder;
- a friction-promoting rubber coating on the main surface of said support cylinder extending from the other end thereof to said annular projection thereby forming said inner rest portion;
- a friction-promoting rubber coating on said skirt member extending from one end thereof to said end flange at its other end thereby forming said outer rest portion;
- said exchangeable ring member having a smooth surface to form said net-slide portion formed as a concave groove uniformly chamfered from said annular projection to said end flange, one side surface of said groove and a peripheral surface of said end flange extending flush with a conical transition portion of said rubber coating on said skirt member, the opposite side surface of said groove extending convexly into a peripheral surface of said annular projection on said support cylinder.

8. The winch according to claim 7, wherein each roller has a shield at the end remote from the common pivotable end member and adjacent said skirt member, said shield being fixed to said end member by a support shaft located internally in said roller and ensuring the positioning of the net on the roller.

9. In a winch for hauling a purse net on board a fishing vessel comprising at least two rollers rotatable in mutually opposite directions for pulling said net by frictional engagement therewith, a common pivotable end member from which the rollers project freely outwards in spaced apart relation and for adjusting said rollers in various oblique positions relative to a vertical plane, wherein each of said rollers comprises:

- an inner rest portion having friction-promoting means on its surface;
- an outer rest portion having friction-promoting means on its surface;
- said inner rest portion having a diameter smaller than said outer rest portion; and
- an annular portion arranged between said inner and outer rest portions thereby constituting a net-slide portion having a diameter substantially smaller than the diameter of said inner rest portion, said net-slide portion being formed without friction-promoting means on its surface;
- whereby the net, when being hauled by said winch, normally rides over said inner rest portion of said rollers, a float-portion of said net being made to selectively ride over said annular portion and said outer rest portion as regulated by the oblique positioning of the axis of said rollers, when riding over said outer rest portion said float-portion moves at increased speed with respect to that portion of the net riding over said inner rest portion, and when riding over said annular portion said float-portion moves at decreased speed with respect to that portion of the net riding over said inner rest portion.

* * * * *